March 17, 1925.
V. KASTNER
1,530,372
MOTOR VALVE
Filed Oct. 8, 1924
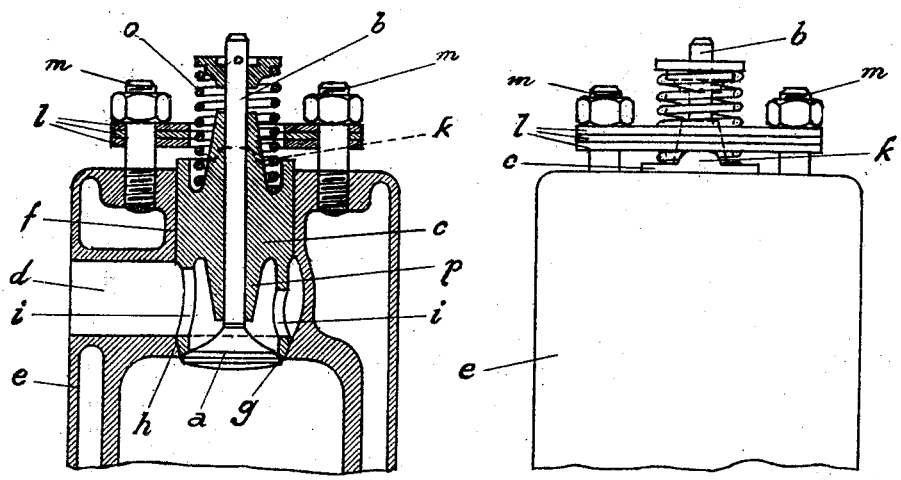
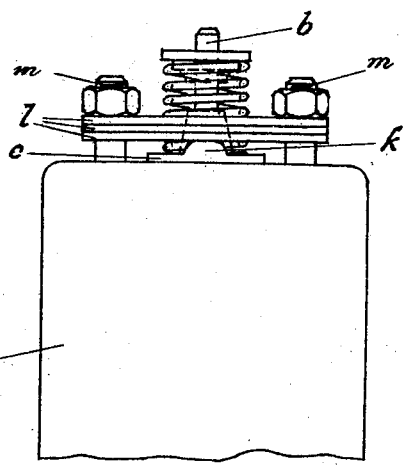
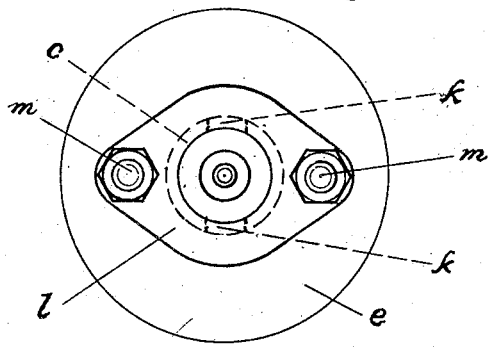
Inventor
Viktor Kastner Patented Mar. 17, 1925.

1,530,372

UNITED STATES PATENT OFFICE.

VIKTOR KASTNER, OF AACHEN, GERMANY.

MOTOR VALVE.

Application filed October 8, 1924. Serial No. 742,480.

*To all whom it may concern:*

Be it known that I, VIKTOR KASTNER, a citizen of Germany, residing at Aachen, No. 20 Bachstrasse, Rhenish Prussia, Germany, have invented certain new and useful Improvements in Motor Valves; and I do hereby declare the following to be a full, clear, and exact description of the invention, such as will enable others skilled in the art to which it appertains, to make and use the same.

This invention relates to the arrangement of the valves in motors, and more particularly in internal combustion motors, with which the valve cages are yieldably pressed against the seats provided for them in the cylinder by means of screw bolts fastened to the cylinder and springs which, on the one hand, bear against the nuts of the said screw bolts and, on the other hand, against the valve cages themselves.

The invention has for its object to provide a valve arrangement of the kind stated which is of a simple, compact and durable construction and which has springs exerting a strong pressure on the valve cages so as to press them uniformly and tightly against their seats in the cylinder, thereby preventing a jamming of the cages in the cylinder bores receiving them. Another object of the invention is to dispense with all fastening flanges on the valve cages so that the same may be made as simple bodies of revolution the circumference of which may be easily worked upon and with which, when inserted in the cylinder, there will arise no accumulations of heat which otherwise would entail a warping of the valve cages and seats, thereby rendering the valves leaky.

These objects are essentially attained by using laminated or plate springs for pressing the valve cages into the bores of the cylinder receiving them, said springs being arranged so that they connect the fastening bolts with each other and, while having an opening for the movement therethrough of the valve stem and spring, engage the valve cages centrally, for instance through the intermediary of spherical supporting faces.

According to the invention these spherical supporting faces are preferably formed by two diametrically opposite projections of a knife-edge or ball-like shape which are carried either by the laminated springs or the valve cages in a vertical position with relation to the springs and by means of which or at which, as the case may be, the springs engage the valve cages in the way of scale-beams.

An embodiment of the subject-matter of the invention as applied to an internal combustion is illustrated in the accompanying drawing in which:

Figure 1 is a partial longitudinal section through a cylinder of the engine with a valve according to the invention, Fig. 2 is a corresponding top plan, and Fig. 3 is a corresponding side elevation.

Referring now to the drawing, it will be seen that the valve disc $a$ is shiftably guided in the cage $c$ by means of the stem $b$. The cage $c$ is loosely mounted in a bore $f$ of the cylinder $e$ which bore extends transversely with relation to the channel $d$, which may be either the intake or exhaust channel, respectively, of the cylinder $e$. The cage has a lower hollow portion which constitutes at its end a seat $g$ for the valve disc $a$. It is besides provided with an outer packing surface $h$ by which it rests on a corresponding seating face formed by the valve opening of the cylinder. The lower hollow space of the cage $c$ is in communication with the channel $d$ by means of openings $i$ provided in the outer wall of the cage. The upper end of the cage $c$ which extends beyond the cylinder is provided at its outer annular edge with two diametrically opposed cam-like projections $k$ on which bears a multiple plate spring $l$. This spring is held in position by two stud bolts $n$ screwed into the cylinder. The plate spring $l$ has a central opening through which passes the valve spring $o$ which bears by its lower end against the cage $c$. The cage $c$ has the shape of a ribless body of revolution. At its lower end the cage $c$ is provided with a guiding extension $p$ which tapers in the direction towards the valve disc $a$ and extends to a point near the latter. The plate spring $l$ constantly presses the cage $c$ into the bore $f$ so as to cause its outer packing face $h$ to be always tightly seated on the corresponding seating face formed by the valve opening of the cylinder. This will also be the case if, upon the cylinder and the cage getting heated to a certain degree, the upper end of the cage $c$ will advance beyond the cylinder to a distance greater than in the normal condition. In this case, the plate spring $l$ yields upwardly. The cage, owing to its peculiar shape, favors and accelerates the delivery of heat from the valve disc and stem to the cylinder and its water jacket.

Having thus described my invention, what I claim as new and desire to secure by Letters-Patent, is:—

1. In a motor the combination with the cylinder, of a valve, a valve cage mounted in a bore of the cylinder and yieldably pressed against its seat by means of screw bolts and springs bearing on the one hand against nuts of the said bolts and on the other hand against the cage, the said springs consisting of plate springs connecting the said screw bolts with each other, a central opening in the plate springs for the passage therethrough of the valve stem and valve spring, and means underneath the plate springs having bearing edges through which the plate springs act centrally on the valve cage.

2. In a motor the combination with the cylinder, of a valve, a valve cage mounted in a bore of the cylinder and yieldably pressed against its seat by means of screw bolts and springs bearing on the one hand against nuts of the said bolts and on the other hand against the cage, the said springs consisting of plate springs connecting the said screw bolts with each other, a central opening in the plate springs for the passage therethrough of the valve stem and valve spring, and diametrically opposite projections on the valve cage standing vertically with relation to and forming bearing edges for the plate springs so as to enable the springs to act on the valve cage by engaging the said bearing edges like scale-beams.

3. In a motor the combination with the cylinder, of a valve, a valve cage mounted in a bore of the cylinder and yieldably pressed against its seat by means of screw bolts and springs bearing on the one hand against the nuts of the said bolts and on the other hand against the cage, the cage being formed as a body of revolution and the said springs consisting of plate springs connecting the said screw bolts with each other, a central opening in the plate springs for the passage therethrough of the valve stem and valve spring, and means underneath the plate springs having bearing edges through which the plate springs act centrally on the valve cage.

In testimony whereof I have signed my name to this specification.

VIKTOR KASTNER.